US011188101B2

(12) United States Patent
Zhou et al.

(10) Patent No.: US 11,188,101 B2
(45) Date of Patent: Nov. 30, 2021

(54) METHOD FOR CONTROLLING AIRCRAFT, DEVICE, AND AIRCRAFT

(71) Applicant: SZ DJI TECHNOLOGY CO., LTD., Shenzhen (CN)

(72) Inventors: You Zhou, Shenzhen (CN); Xuyang Feng, Shenzhen (CN); Cong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 228 days.

(21) Appl. No.: 16/426,182

(22) Filed: May 30, 2019

(65) Prior Publication Data
US 2020/0027357 A1 Jan. 23, 2020

Related U.S. Application Data

(63) Continuation of application No. PCT/CN2016/107997, filed on Nov. 30, 2016.

(51) Int. Cl.
G05G 5/00 (2006.01)
H04N 5/28 (2006.01)
(Continued)

(52) U.S. Cl.
CPC ........... *G05D 1/106* (2019.05); *B64C 39/024* (2013.01); *B64D 47/08* (2013.01); *G05D 1/0094* (2013.01);
(Continued)

(58) Field of Classification Search
CPC ...... G05D 1/106; G05D 1/0094; G05D 1/102; G05D 1/0808; G05D 1/12; G05D 1/101; G05D 1/00; B64C 39/024; B64C 2201/024; B64C 2201/127; B64C 2201/141; B64C 2201/146; B64C 2201/123; B64D 47/08; G08G 5/0034; G08G 5/0069; G08G 5/0086; G08G 5/0013; G08G 5/0026; G08G 5/00; H04N 5/23203; H04N 5/28; H04N 5/23222; H04N 5/23212; H04N 5/23299; H04N 5/23219; H04N 5/23218
See application file for complete search history.

(56) References Cited

U.S. PATENT DOCUMENTS 10,074,284 B1 * 9/2018 Priest .................... H04W 4/021
10,942,529 B2 * 3/2021 Huang ................. H04N 13/239
(Continued)

FOREIGN PATENT DOCUMENTS

CN 104020777 A 9/2014
CN 104808675 A 7/2015
(Continued)

OTHER PUBLICATIONS

World Intellectual Property Organization (WIPO) International Search Report for PCT/CN2016/107997 dated Sep. 1, 2017 8 Pages.

*Primary Examiner* — Yonel Beaulieu
(74) *Attorney, Agent, or Firm* — Anova Law Group, PLLC

(57) ABSTRACT

A method for controlling an aircraft includes determining photographing information related to a photographing object, the photographing information indicating an occupying scope of the photographing object in an image to be captured. The method also includes controlling the aircraft to fly to a photographing location based on the photographing information.

18 Claims, 8 Drawing Sheets

(51) Int. Cl.
    *G05D 1/00*                 (2006.01)
    *G05D 1/10*                 (2006.01)
    *B64C 39/02*               (2006.01)
    *B64D 47/08*               (2006.01)
    *G08G 5/00*                 (2006.01)
    *H04N 5/232*              (2006.01)

(52) U.S. Cl.
CPC ......... *G08G 5/0034* (2013.01); *G08G 5/0069* (2013.01); *H04N 5/23203* (2013.01); *H04N 5/28* (2013.01); *B64C 2201/024* (2013.01); *B64C 2201/127* (2013.01); *B64C 2201/141* (2013.01); *B64C 2201/146* (2013.01)

(56) References Cited

U.S. PATENT DOCUMENTS

| | | |
|---|---|---|
| 2008/0204402 A1 | 8/2008 | Hirata et al. |
| 2009/0225001 A1* | 9/2009 | Biocca ............... G02B 27/0172 345/8 |
| 2014/0063243 A1* | 3/2014 | Giuffrida ............... H04N 7/181 348/144 |
| 2016/0031559 A1 | 2/2016 | Zang |
| 2017/0345317 A1* | 11/2017 | Heinonen ............... G01C 21/20 |
| 2017/0355457 A1* | 12/2017 | Terry .................... B64C 39/024 |
| 2017/0358068 A1* | 12/2017 | Strebel .................. G01S 17/89 |
| 2017/0358228 A1* | 12/2017 | Priest .................... B64C 39/024 |
| 2018/0356840 A1* | 12/2018 | Ham .................... G08G 5/0082 |
| 2019/0206073 A1* | 7/2019 | Huang ................. H04N 13/239 |
| 2020/0007746 A1* | 1/2020 | Cao ....................... G03B 15/006 |
| 2020/0326729 A1* | 10/2020 | Ham ...................... G08G 5/025 |
| 2021/0072745 A1* | 3/2021 | Chen ....................... G05D 1/101 |

FOREIGN PATENT DOCUMENTS

| | | |
|---|---|---|
| CN | 104828256 A | 8/2015 |
| CN | 105391939 A | 3/2016 |
| CN | 105430261 A | 3/2016 |
| CN | 105438488 A | 3/2016 |
| CN | 105512643 A | 4/2016 |
| CN | 105554480 A | 5/2016 |
| CN | 105843241 A | 8/2016 |
| CN | 105867362 A | 8/2016 |
| CN | 105979147 A | 9/2016 |

* cited by examiner

METHOD FOR CONTROLLING AIRCRAFT, DEVICE, AND AIRCRAFT

CROSS-REFERENCE TO RELATED APPLICATION

This application is a continuation application of International Application No. PCT/CN2016/107997, filed on Nov. 30, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technology field of controls and, more particularly, to a method for controlling an aircraft, a device, and an aircraft.

BACKGROUND

As the advance of flight technologies, aircrafts, such as unmanned aerial aircrafts ("UAVs"), also referred to as drones, have been deployed from military applications to civil applications, such as plant protection, aerial photography, forest fire surveillance, etc. It appears to be a future trend for UAVs to be used in more and more civil applications.

Currently, when using an imaging device carried by the UAV to perform aerial photography, a user has to operate a remote terminal or remote control device to control the attitude of the aircraft, the flight distance, and the rotation of a gimbal carried by the UAV to achieve the adjustments and controls needed for image capturing. The operations are cumbersome, and the operations are not user-friendly. In addition, because the time spent by the user operations takes up much of the flight time, the actual flight time is reduced. The lack of easy-to-use interactive controls and photographing control system may reduce the utility of the UAV-based aerial photography in certain applications.

SUMMARY

In accordance with an aspect of the present disclosure, there is provided a method for controlling an aircraft. The method includes determining photographing information related to a photographing object, the photographing information indicating an occupying scope of the photographing object in an image to be captured. The method also includes controlling the aircraft to fly to a photographing location based on the photographing information.

In accordance with another aspect of the present disclosure, there is also provided a device including a memory configured to store instructions. The device also include a processor configured to execute the instructions to determine photographing information related to a photographing object, the photographing information indicating an occupying scope of the photographing object in an image to be captured. The processor is also configured to control an aircraft to fly to a photographing location based on the photographing information.

In various embodiments of the present disclosure, the aircraft may be controlled to fly to a suitable photographing location based on an occupying scope in which a photographing object is expected by a user to be located in an image to be captured. As a result, the manual operations of the aircraft during the photographing process can be reduced, which in turn reduces the amount of time spent in manual operations in the total flight time, thereby increasing the continuous flight capability of the aircraft.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
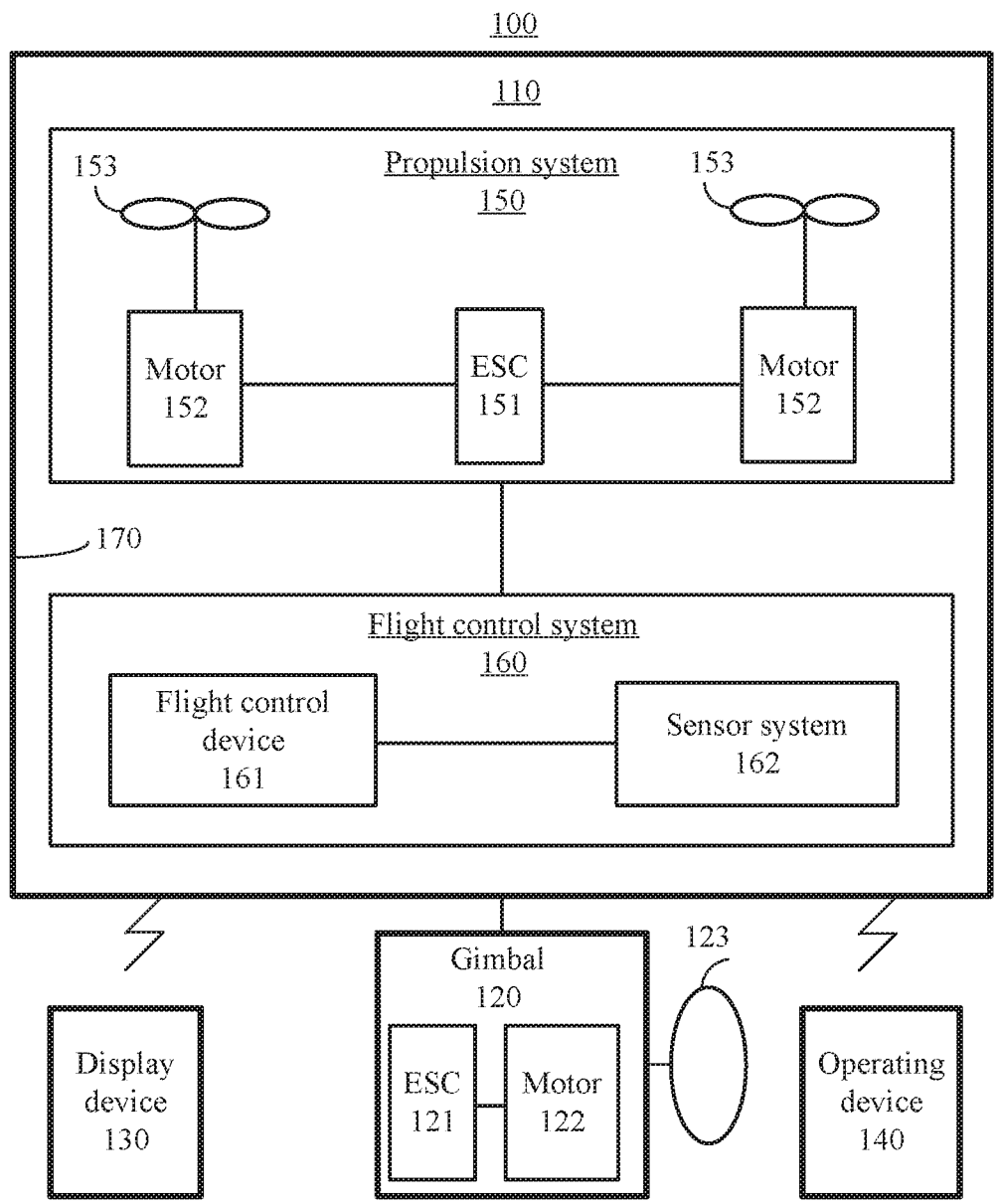
FIG. 1 is a schematic diagram of an unmanned flight system, according to an example embodiment.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless.

When a first component is referred to as "disposed," "located," or "provided" on a second component, the first component may be directly disposed, located, or provided on the second component or may be indirectly disposed, located, or provided on the second component via an intermediate component. The term "on" does not necessarily mean that the first component is located higher than the second component. In some situations, the first component may be located higher than the second component. In some situations, the first component may be disposed, located, or provided on the second component, and located lower than the second component. In addition, when the first item is disposed, located, or provided "on" the second component, the term "on" does not necessarily imply that the first component is fixed to the second component. The connection between the first component and the second component may be any suitable form, such as secured connection (fixed connection) or movable contact.

When a first component is referred to as "disposed," "located," or "provided" in a second component, the first component may be partially or entirely disposed, located, or provided in, inside, or within the second component. When a first component is coupled, secured, fixed, or mounted "to" a second component, the first component may be is coupled, secured, fixed, or mounted to the second component from any suitable directions, such as from above the second component, from below the second component, from the left side of the second component, or from the right side of the second component.

The terms "perpendicular," "horizontal," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure.

In addition, the singular forms "a," "an," and "the" are intended to include the plural forms as well, unless the context indicates otherwise. And, the terms "comprise," "comprising," "include," and the like specify the presence of stated features, steps, operations, elements, and/or components but do not preclude the presence or addition of one or more other features, steps, operations, elements, components, and/or groups. The term "and/or" used herein includes any suitable combination of one or more related items listed. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined.

The following embodiments do not limit the sequence of execution of the steps included in the disclosed methods. The sequence of the steps may be any suitable sequence, and certain steps may be repeated.

The present disclosure provides a method for controlling an aircraft, a device or an apparatus. The following descriptions use UAV as an example of the aircraft. A person having ordinary skill in the art can appreciate that the aircraft is not limited to the UAV. In addition, the UAV can be any type of UAV, such as a small- or micro-sized UAV. In some embodiments, the UAV may be a rotorcraft. For example, the UAV may be a rotorcraft that is air-propelled by one or more propulsion devices or assemblies. The UAV may be any other type of UAV, or any other movable device.

FIG. 1 is a schematic diagram of the structure of an unmanned flight system 100. In the following descriptions, the rotorcraft is used as an example of the UAV.

The unmanned flight system 100 may include a UAV 110, a gimbal 120, a display device 130, and an operating device 140. The UAV 110 may include a propulsion system 150, a flight control system 160, and an aircraft frame 170. The UAV 110 may wirelessly communicate with the operating device 140 and the display device 130.

The aircraft frame 170 may include an aircraft body and a landing stand (or landing gear). The aircraft body may include a central frame and one or more arms connected with the central frame. The one or more arms may radially extend from the central frame. The landing stand may be connected with the aircraft body to support the UAV 110 during landing.

The propulsion system 150 may include an electrical speed control ("ESC") 151, one or more propellers 153, and one or more motors 152 corresponding to the one or more propellers 153. Each motor 152 may be mechanically and/or electrically coupled between the ESC 151 and the propeller 153. In some embodiments, the motor 152 and the propeller 153 may be mounted on a corresponding arm. The ESC 151 may be configured to receive a driving signal generated by the flight control system 160, and to provide a current for driving the motor 152 based on the driving signal, thereby controlling the rotation speed of the motor 152. The motor 152 may be configured to drive the propeller 153 to rotate, thereby providing a propulsion force for the flight of the UAV 110. The propulsion force enables the UAV 110 to move in one or more degrees of freedom. In some embodiments, the UAV 110 may rotate around one or more rotation axes. For example, the rotation axes may include at least one of a roll axis, a yaw axis, or a pitch axis. In some embodiments, the motor 152 may include a direct current motor or an alternating current motor. In some embodiments, the motor 152 may be a brushless motor or a brushed motor.

The flight control system 160 may include a flight control device 161 and a sensor system 162. The sensor system 162 may be configured to measure, obtain, or detect attitude information of the UAV 110, e.g., the spatial location information of the UAV 110 and the status information of the UAV 110, such as at least one of a three-dimensional location or position, a three-dimensional angle, a three-dimensional velocity, a three-dimensional acceleration, or a three-dimensional angular velocity. The sensor system 162 may include at least one of a gyroscope, a digital compass, an inertial measurement unit ("IMU"), a vision sensor, a global navigation satellite system, or a barometer. For example, the global navigation satellite system may include a global positioning system ("GPS"). In some embodiments, the flight control device 161 may be configured to control the flight of the UAV 110. For example, the flight control device 161 may control the flight of the UAV 110 based on the attitude information obtained by the sensor system 162. In some embodiments, the flight control device 161 may control the UAV 110 based on pre-programmed computer codes or instructions. In some embodiments, the flight control device 161 may control the UAV 110 based on one or more commands or instructions received from the operating device 140.

The gimbal 120 may include an ESC 121 and a motor 122. The gimbal 120 may be configured to carry an imaging device 123. The flight control device 161 may control the motion of the gimbal 120 through the ESC 121 and the motor 122. In some embodiments, the gimbal 120 may include a controller configured to control the motion of the gimbal 120 through the ESC 121 and the motor 122. In some embodiments, the gimbal 120 may be independent of the UAV 110, or may be part of the UAV 110. In some embodiments, the motor 122 may be a direct current motor or an alternating current motor. The motor 122 may be a brushless motor or a brushed motor. In some embodiments, the gimbal 120 may be disposed at a top portion of the UAV 110 or at a lower portion of the UAV 110.

The imaging device 123 may include any device for capturing images, such as at least one of a camera or a camcorder. The imaging device 123 may communicate with the flight control device 161 and capture images under the control of the flight control device 161.

The display device 130 may be located at a ground terminal of the unmanned flight system 100, and may be configured to wirelessly communicate with the UAV 110. The display device 130 may display the attitude information of the UAV 110. In some embodiments, the display device 130 may be configured to display images captured by the imaging device 123. The display device 130 may be an independent device, or may be part of the operating device 140.

The operating device 140 may be located at the ground terminal of the unmanned flight system 100, and may be configured to wirelessly communicate with the UAV 110 to control the UAV 110 remotely. The operating device 140 may include a remote control device or a user terminal installed with an application (or "App") for controlling the UAV 110, such as a smart phone, a tablet, etc. In some embodiments, the operating device 140 may receive an input from a user through an input device, such as a wheel, a button, a key, or a joystick, to control the UAV 110. In some embodiments, the operating device 140 may receive an input from the user through a user interface ("UI") provided at the user terminal to control the UAV 110.

The names of the parts of the unmanned flight system are only intended for identifying various parts, and are not intended to limit the scope of the present disclosure.

Figure 2:
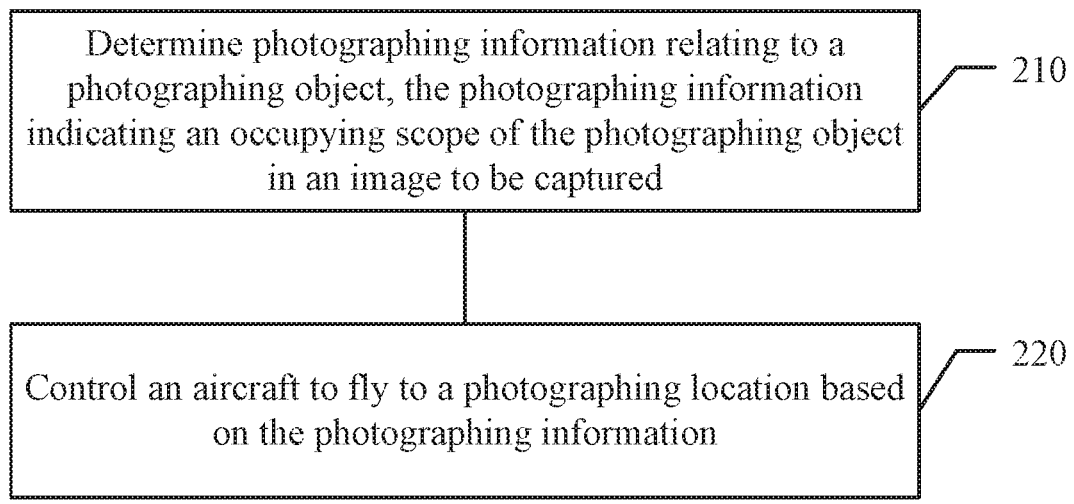
FIG. 2 is a flow chart illustrating a method for controlling an aircraft, according to an example embodiment.

FIG. 2 is a flow chart illustrating a control method for controlling an aircraft. The control method of FIG. 2 may be executed by a control device or apparatus, such as the flight control device 161 of FIG. 1. The present disclosure does not limit the entity for executing the control method. For example, the control method of FIG. 2 may be executed by other control devices or apparatuses carried by the UAV 110. For convenience and illustration purposes, in the following discussions, the flight control device 161 may be used as an example entity for executing the disclosed methods. The control method of FIG. 2 may include the following steps.

Step 210: determining photographing information relating to a photographing object, the photographing information indicating an occupying scope of the photographing object in an image to be captured. In some embodiments, the photographing information may include a proportion indicating how much (e.g., percentage) an image of the photographing object occupies the image to be captured, or a size of the occupying scope that the image of the photographing object occupies the image to be captured.

In some embodiments, the photographing information may include a scene selected by a user. The scene may be categorized in three types: large scene, medium scene, and small scene, based on the proportions or occupying scopes that the image of the photographing object occupies the image to be captured. Each type of scene can be further divided into additional types. The larger the scene, the smaller the proportion or occupying scope that the image of the photographing object occupies the image to be captured, and vice versa. In some embodiments, human portraits can be categorized into different scenes based on a proportion or occupying scope that an area of the photographing object occupies the image to be captured. The different scenes may include a whole body image, a greater-than-half-body image, a half body image, a chest image, a head-and-shoulder image, or a big-head image. In some embodiments, the photographing information may include at least one of the large scene, medium scene, or small scene. In some embodiments, the photographing information may include at least one of a whole body image, a greater-than-half-body image, a half body image, a chest image, a head-and-shoulder image, or a big-head image.

In some embodiments, a user may pre-select or pre-set the relationship between different scenes and different proportions or occupying scopes that the photographing object occupies the image to be captured. When a user selects a certain scene, the corresponding proportion or occupying scope that the photographing object occupies the image to be captured may be automatically determined. The present disclosure does not limit the method of determining the photographing information. For example, a user may input the proportion or occupying scope that the photographing object occupies the image to be captured from a user interface. In some embodiments, the user may draw an area on a touch screen to specify the occupying scope that the photographing object occupies the image to be captured.

The photographing object may also be referred to as a photographing target or a photographing body. The photographing object may be the user who operates the aircraft, or other humans or objects.

The above categorization of scenes is only for illustration purposes. In practice, different scene categories may be defined based on actual implementations.

Step 220: controlling the aircraft to fly to a photographing location based on the photographing information.

In some embodiments, there may be a corresponding relationship between the proportion or occupying cope that the photographing object occupies an image to be captured and a distance between the imaging device and the photographing object (hereinafter referred to as photographing distance). For example, the relationship between the proportion or occupying scope that the photographing object occupies the image to be captured and the photographing distance may be an inverse proportional relationship. That is, the larger the proportion or occupying scope that the photographing object occupies the image to be captured, the shorter the photographing distance (i.e., the closer the imaging device is disposed relative to the photographing object), and vice versa. For example, the flight control device of the aircraft may estimate a photographing location based on the proportion or occupying scope that the photographing object occupies the image to be captured, and may control the aircraft to fly to the photographing location. In some embodiments, the flight control device may dynamically adjust a target location of the aircraft, such that the proportion or occupying scope that the photographing object occupies the image to be captured becomes consistent with an occupying scope indicated by the photographing information, thereby controlling the aircraft to fly to the suitable photographing location.

In some embodiments, the flight control device may control the aircraft to fly to the suitable photographing location based on a user expected scope that the photographing object occupies the image to be captured, which may reduce the manual interference of the aircraft during the photographing process, thereby enhancing the user experience. In addition, by reducing the time spent in the manual operations in the overall flight time, the continuous flight capability of the aircraft may be increased.

Based on the present disclosure, the photographing information for the photographing object may be determined using the following methods:

1) determining the photographing information based on an input received from external devices. For example, a user interface may include at least one of a button, a text input window, a selection window or other suitable user interface elements for inputting the photographing information. A user may select or input the proportion or occupying scope that the photographing object occupies the image to be captured through the user interface of the external device (e.g., user terminal or remote control device). In some embodiments, the flight control device may receive the photographing information from an external device through a communication interface. Thus, the user may input the photographing information, such that the imaging device may capture an image having a size that matches the user's expectation.

2) detecting at least one of a velocity, an acceleration, and a throw-flying trajectory when the aircraft is thrown to fly, and selecting the photographing information from various types of pre-set or predetermined photographing information based on at least one of the velocity, acceleration, and throw-flying trajectory. Determining the photographing information by detecting the velocity and acceleration when the aircraft is thrown to fly means the photographing information may be determined based on the force the user uses when throwing the aircraft to fly. For example, the larger the force, the larger the velocity and/or the acceleration when the aircraft is thrown to fly. This indicates that the user expects the aircraft to fly farther. In other words, the user expects the scene to be larger when capturing the images, or the user expects the proportion or occupying scope that the photographing object occupies the image to be captured to be smaller, and vice versa. In some embodiments, the larger the angle between the throw-flying trajectory and a horizontal plane, the farther the user expects the aircraft to fly, or the larger the user expects the scene of the images to become, and vice versa. In the disclosed embodiments, because the photographing information may be determined based on the status of the throw-flying by the user, there is no need to manually set the photographing information through an external device. As a result, user experience can be enhanced, and the time spent in manual operations can be further reduced in the overall flight time, thereby increasing the continuous flight capability of the aircraft.

In some embodiments, the definition of the photographing information and the methods of determining the photographing information are not limited to the above-described. Any other methods that can distinguish the photographing information can be used.

In some embodiments, the control method of FIG. 2 may also include: obtaining an image of the photographing object, and determining the photographing object based on the image.

In some embodiments, the imaging device may be controlled to obtain a characteristic image of the photographing object. For example, when the photographing object is an animal or a human, the characteristic image may be a facial characteristic image. The characteristic image may be used for searching for, identifying, and tracking the photographing object. For example, an image currently obtained by the imaging device may be compared with the characteristic image. If the two images match, then the imaging device may be controlled to search for, identify, and track the photographing object.

In the present disclosure, the image of the photographing object may be obtained using one of the following methods:

1) prior to the takeoff of the aircraft, controlling the imaging device to capture an image of the photographing object. For example, prior to the takeoff of the aircraft, the user may point the imaging device at the photographing object and capture a characteristic image of the photographing object.

2) after the aircraft takes off, controlling the imaging device to capture an image of the photographing object. For example, a user may control the aircraft to turn an aircraft head of the aircraft such that the imaging device points to the photographing object to capture a characteristic image of the photographing object.

3) obtaining the image of the photographing object by receiving the image of the photographing object from an external device. For example, a user may send a characteristic image of the photographing object that has been saved on a user terminal to the flight control device through a communication interface between the user terminal and the flight control device.

In some embodiments, the control method of FIG. 2 may further include: determining a flight path of the aircraft when photographing the photographing object, and controlling the imaging device to capture images of the photographing object when the aircraft flies along the flight path.

In some embodiments, the user may throw the aircraft to fly. The aircraft may identify the action of throwing of the user and may select a suitable flight path based on the identified action. In the present disclosure, a user may use simple actions to direct the aircraft to select a flight path that the user expects. As a result, user experience is enhanced. In addition, the time spent in manual operations is reduced in the overall flight time, thereby increasing the continuous flight capability of the aircraft.

Alternatively or additionally, in some embodiments, the flight path of the aircraft may be determined based on an input received from an external device. For example, a user interface may include at least one of a button, a text window, or a selection window, or other suitable user interface elements for inputting the information relating to the flight path. A user may input or select the flight path.

Alternatively or additionally, in some embodiments, a motion of the aircraft may be detected through one or more motion sensors. First motion data may be obtained from the motion sensors, and the flight path may be determined based on the first motion data. The first motion data may include one or more of a location, a velocity, an angular velocity, or an acceleration, which may change over time.

Alternatively or additionally, in some embodiments, the flight control device may obtain second motion data output by one or more motion sensors of an external device that detects a motion of the external device. The flight control device may determine the flight path based on the second motion data. The second motion data may include one or more of a location, velocity, angular velocity, or acceleration of the user terminal, which may change over time.

In some embodiments, the external device may be the user terminal. A user may hold the user terminal in his/her hand and perform a specific action before the aircraft takes off. The motion sensor included in the user terminal may detect the motion of the user terminal and output the motion data to the flight control device. The flight control device may determine the flight path based on the motion data. For example, if the action of the user terminal is a circular motion, the aircraft may determine that the flight path should be a circular flight.

The motion sensor may include at least one of a gyroscope, a digital compass, an IMU, an accelerometer, a global navigation satellite system, or a vision sensor.

The motion may include at least one of a circular motion, a pulling-away motion, a pulling-closer motion, or an S-shaped motion. The motion may include at least one of a motion in a vertical plane or a motion in a horizontal plane. For example, the circular motion may be in a vertical plane, or in a horizontal plane. The above-described motions are only examples. Other motions may also be used to determine the flight path.

When a motion is a circular motion, the control method of FIG. 2 may also include: prior to takeoff of the aircraft, detecting the rotation of the gimbal of the aircraft around a pitch axis; and determining the flight path as one of a spiral ascent or a spiral descent.

In some embodiments, prior to determining the flight path of the aircraft, the control method of FIG. 2 may also include: determining whether a signal for activating the determination of the flight path has been received. The signal may be used to activate the determination process of the flight path of the aircraft.

In some embodiments, if no flight path is input in a predetermined time period, the flight path may be determined as a tracking flight.

A tracking flight refers to flying to track movement of a moving object. For example, the flight control device may control the aircraft to fly while tracking the moving photographing object. The tracking may be based on GPS tracking, i.e., using GPS positioning technology to realize the tracking flight. In some embodiments, the tracking may be based on vision tracking, i.e., using vision sensors and imaging recognition technology to realize the tracking flight.

In some embodiments, the flight path may include at least one of a circular motion, a pulling-away motion, a pulling-closer motion, or an S-shaped motion.

In some embodiments, the control method of FIG. 2 may also include: control the imaging device carried by the aircraft to capture images of the photographing object after the aircraft has arrived at the photographing location.

In some embodiments, the control method of FIG. 2 may also include: receiving an image composition rule from an external device; or determining the image composition rule based on identifying a predetermined action or gesture of the photographing object.

In some embodiments, the image composition rule may include one or more of a location of the photographing object in the image to be captured, an angle of the face of the photographing object in the image to be captured, and a degree of integrity of the face of the photographing object in the image to be captured.

For example, the image composition rule may include at least one of a balanced composition, a symmetric composition, a diagonal composition, a triangular composition, a nine-square composition, a centripetal composition, a division composition, a front view of the face of the human in the image to be captured, or a side view of the face of the human in the image to be captured.

In some embodiments, controlling the imaging device carried by the aircraft to capture images of the photographing object may include: controlling the image composition of the imaging device, such that imaging of the photographing object in the image to be captured satisfies the predetermined image composition rule; and capturing an image of the photographing object when the imaging of the photographing object in the image to be captured satisfies the predetermined image composition rule.

In some embodiments, controlling the image composition of the imaging device, such that imaging of the photographing object in the image to be captured satisfies the predetermined image composition rule may include: controlling the image composition of the imaging device by adjusting at least one of the flight attitude of the aircraft, the motion of the gimbal of the imaging device, or a focal length of the imaging device, such that a location of the photographing object in the image to be captured satisfies the predetermined image composition rule.

During the imaging process, an image of the photographing object in the currently captured image may be obtained. A location of the photographing object in the currently captured image may be determined using image recognition. Then a determination is made as to whether the location of the photographing object in the currently captured image satisfies the predetermined image composition rule. For example, if the user selected the nine-square image composition rule, the photographing object may be imaged at the four crossing points of the nine-square grid. In some embodiments, the nine-square image composition may be further divided into four modes corresponding to the four crossing points. A user may select a crossing point onto which the photographing object may be imaged. In some embodiments, whether a center of the photographing object is located at a certain crossing point of the nine-square grid may be determined by image recognition. In some embodiments, a distance and/or a direction of a center of the photographing object from a certain crossing point of the nine-square grid may be determined. The imaging composition may be adjusted based on these determinations such that the center of the photographing object may overlap or coincide with a certain crossing point of the nine-square grid.

In some embodiments, controlling the imaging device carried by the aircraft to capture images of the photographing object may include: controlling the imaging device to adjust the focal length of the imaging device based on the depth of field principle, and capturing images of the photographing object based on the adjusted focal length.

When capturing images of objects or scenes of different distances, e.g., when photographing multiple rows of people or an object of a large size or volume, the focal length may be adjusted based on the depth of field principle. That is, a suitable focal point may be set such that the imaging device may capture clear images of all of the objects or scenes.

For example, when photographing multiple people, a photographing distance or photographing location may be determined based on the number of photographing bodies. For example, the number of photographing objects may be counted by the user prior to the takeoff of the aircraft. The more the people, the farther the aircraft will fly, and vice versa. When the aircraft flies to the photographing location, the aircraft may adjust the focal length based on the depth of field principle. For example, as shown in equations (1), (2), and (3), the front depth of field is shallower than the rear depth of field, so the front depth of field may need to focus at the front ⅓ of the length of the entire lens array. The value ⅓ is an empirical value. The lens of the imaging device may focus at the front ⅓ of the length of the entire row of multiple people. For example, when photographing five rows of people, the focus may be placed on people in the middle of the second row. This may effectively utilize the front depth of field and the rear depth of field to obtain a clear image of all five rows of people.

$$\Delta L_1 = \frac{F\sigma L^2}{f^2 + F\sigma L} \qquad \text{equation (1)}$$

$$\Delta L_2 = \frac{F\sigma L^2}{f^2 + F\sigma L} \qquad \text{equation (2)}$$

$$\Delta L = \frac{2f^2 F\sigma L^2}{f^4 - F^2\sigma^2 L^2} \qquad \text{equation (3)}$$

where σ is a diameter of a permissible circle of confusion, $f$ is the focal length of the lens, F is the aperture of the lens, L is the focal distance, $\Delta L_1$ is the front depth of field, $\Delta L_2$ is the rear depth of field, $\Delta L$ is the depth of field.

In some embodiments, the control method of FIG. 2 may include: detecting status information of the environment and/or gesture information of the photographing object, and adjusting a photographing angle based on the status information of the environment and/or the gesture information of the photographing object.

The status information of the environment may include, for example, information indicating backlighting, weather condition, brightness of sunlight, etc. The gesture information of a human body may include, for example, information indicating gestures such as an orientation of the head, standing, sitting, etc. The photographing angle may include shooting from above, shooting from side, or shooting from below, etc.

In some embodiments, when detecting that the current photographing angle is against the light, the imaging device may avoid shooting at the current photographing angle. In some embodiments, when detecting that a side of the photographing object is facing the imaging device, the imaging device may adjust the photographing angle such that the imaging device can capture a front face of the photographing object. The above functions may be set or selected by a user using a user interface of an external device (e.g., a user interface of a user terminal) before the aircraft takes off.

Because the photographing angle may be adjusted adaptively based on the status information of the environment and/or the gesture information of the photographing object, the photographing process becomes more intelligent. Manual interference during the photographing process may be reduced, and user experience may be enhanced. In addition, the time spent in manual operations in the overall flight time may be reduced, thereby increasing the continuous flight capability of the aircraft.

In some embodiments, the control method of FIG. 2 may also include: automatically starting the aircraft when the aircraft satisfies a predetermined automatic start condition.

Automatically starting the aircraft means that when the automatic start condition is satisfied, the electrical circuit for starting the aircraft is connected or activated to control the propulsion device of the aircraft to start operating, thereby eliminating manual operations of a button or key to start the aircraft. Because the aircraft may be automatically started based on the predetermined automatic start condition, it is possible to relate the start of the aircraft to the pre-takeoff motion status of the aircraft that is used for setting the flight path or the photographing information, thereby making the entire photographing process smoother, and enhancing the user experience. In addition, the time spent in manual operations in the overall flight time may be reduced, thereby increasing the continuous flight capability of the aircraft.

In the present disclosure, the aircraft may be automatically started using at least one of the following methods:

1) when the aircraft is thrown to fly, detecting third motion data of the aircraft; and automatically starting the propulsion device of the aircraft when the third motion data satisfy a predetermined automatic start condition.

In some embodiments, the third motion data may include a distance that the aircraft is thrown out. The third motion data satisfy the predetermine automatic start condition when the distance the aircraft is thrown out is greater than or equal to a first predetermined value. The first predetermined value may be zero or any other suitable safe distance at which the aircraft does not cause any harm to the user. Starting the aircraft when the distance between the aircraft and the user reaches the safe distance can avoid causing harm to the user.

Alternatively or additionally, the third motion data may include a vertical velocity or a velocity of the aircraft. The third motion data may satisfy the predetermined automatic start condition when the vertical velocity or the velocity is smaller than or equal to a second predetermined value. In some embodiments, the second predetermined value may be zero or any value that is sufficiently close to zero. Starting the aircraft when the vertical velocity or the velocity of the aircraft is smaller than or equal to the second predetermined value may result in a more stable flight when the aircraft is started.

2) before the aircraft is thrown to fly, when the aircraft satisfies a predetermined idling condition, starting the propulsion device and controlling the propulsion device to rotate in an idling state.

In some embodiments, the aircraft may control the propulsion device to rotate in the idling state after being unlocked through a facial recognition. By setting the facial recognition as the predetermined idling condition, the disclosed method can avoid accidentally starting the aircraft. In addition, the disclosed method can relate the automatic start, facial recognition, and identification of the photographing object, such that the entire photographing process becomes smoother. As a result, the user experience is enhanced.

Alternatively or additionally, in some embodiments, the disclosed method may include controlling the propulsion device to rotate in the idling state after the aircraft has been in a horizontal state for more than a predetermined time period. For example, a user may place the aircraft in a horizontal state (e.g., placing the aircraft horizontally in the user's hand) after setting the flight path. Based on the attitude information detected by the sensors of the aircraft, the aircraft may determine that the aircraft has been in a horizontal state (e.g., an attitude angle being zero) for more than the predetermined time period, and may automatically start the aircraft and control the propulsion device to rotate in the idling state. In some embodiments, the flight control device may control the aircraft to fly to a photographing location after the propulsion device has been rotating in the idling state for more than a predetermined idling time period. By relating the automatic start with the determination of the flight path, the entire photographing process becomes smoother. As a result, the user experience is enhanced.

Alternatively or additionally, in some embodiments, the disclosed method may include controlling the propulsion device to rotate in the idling state after receiving a signal that permits the rotation in the idling state. For example, for safety, a signal for permitting the rotation in the idling state may be generated, or received from an external device for controlling the propulsion device of the aircraft to rotate in the idling state. By relating such signals to the automatic start of the aircraft, the safety of the automatic start of the aircraft may be increased.

3) detecting fourth motion data of the aircraft prior to the takeoff; and automatically starting the propulsion device of the aircraft when the fourth motion data satisfy the predetermined automatic start condition.

In some embodiments, the fourth motion data may indicate a time period in which an attitude angle of the aircraft has been within a predetermined range of values. The fourth motion data may satisfy the predetermined automatic start condition when the time period is greater than a third predetermined value (e.g., a predetermined time period).

For example, a user may place the aircraft in a horizontal state (e.g., placing the aircraft horizontally in the user's hand) after setting the flight path. Based on the attitude information detected by the sensors of the aircraft, the aircraft may determine that the aircraft has been in a horizontal state (e.g., an attitude angle being zero) for more than the predetermined time period, and may automatically start the aircraft.

In some embodiments, the one or more conditions for automatic start may be used in combination. For example, the aircraft may be automatically started when the aircraft is unlocked by facial recognition and when the fourth motion data satisfy the predetermined automatic start condition.

In some embodiments, controlling the aircraft to fly to the photographing location based on the photographing information may include: searching for and identifying the photographing object using the imaging device; after searching for and identifying the photographing object, detecting whether the occupying scope of the photographing object in the image to be captured is consistent with the occupying scope indicated by the photographing information. The disclosed method may also include, when the occupying scope of the photographing object in the image to be captured is consistent with the occupying scope indicated by the photographing information, determining the photographing location to be the current location of the aircraft.

In some embodiments, when the proportion that the photographing object occupies the current image is greater than the proportion indicated by the photographing information, the disclosed method may include adjusting the aircraft to move away from the photographing object. When the proportion that the photographing object occupies the current image is smaller than the proportion indicated by the photographing information, the disclosed method may include adjusting the aircraft to move closer to the photographing object. The above adjustments may be performed according to a fixed step size or varying step sizes. When determining that the proportion that the photographing object occupies the current image is consistent with the proportion indicated by the photographing information, the current location of the aircraft may be determined as the photographing location.

Alternatively or additionally, in some embodiments, the control method of FIG. 2 may include: determining a flight direction after the takeoff of the aircraft, and controlling the aircraft to fly to the photographing location based on the flight direction and the photographing information. For example, when adjusting the aircraft to move away from or closer to the photographing object, the aircraft may be adjusted to move away from or closer to the photographing object along the flight direction.

Alternatively or additionally, in some embodiments, the aircraft may be controlled to fly to the photographing location based on the photographing information and photographing parameters of the imaging device. For example, the photographing parameters may include at least one of a field of view ("FOV") parameter or a focal length parameter. For the same scene, the larger the focal length, the larger the step size for adjusting the aircraft to move away from or closer to the photographing object, and vice versa. The larger the FOV, the smaller the step size for adjusting the aircraft to move away from or closer to the photographing object, and vice versa.

In some embodiments, searching for and identifying the photographing object using the imaging device may include: based on a determination that there is no obstacle in front of the aircraft, controlling the aircraft head or the gimbal of the aircraft such that imaging device faces the takeoff location, and searching for and identifying the photographing object using the imaging device.

If there is no obstacle in the flight direction, the aircraft may be controlled to fly in a direction opposite the initial flight direction, such that the lens of the imaging device faces the photographing object to search for and identify the photographing object. Once the imaging device captures the photographing object, the imaging device may lock the face of the photographing object using a tracking algorithm, identify the photographing object, and search the entire body of the photographing object using a human detector to determine the main body of the photographing object.

In some embodiments, searching for and identifying the photographing object using the imaging device of the aircraft may include: based on a determination that there is an obstacle in the flight direction, controlling the aircraft to avoid the obstacle, and controlling the aircraft to turn the aircraft head or the gimbal of the aircraft, such that the imaging device faces the takeoff location to search for and identify the photographing object using the imaging device.

If there is an obstacle in the flight direction, the disclosed method may include obtaining the location and height of a throwing-out point using a location sensor, such as a GPS sensor or a vision sensor. The location and the height of the throwing-out point may be recorded. The disclosed method may include planning a route to circumvent the obstacle. If it is not possible to circumvent the obstacle, the disclosed method may include attempting to increase the height of the aircraft to avoid the obstacle. The aircraft head may be maintained in the flight direction during the flight, thereby ensuring flight safety.

In some embodiments, controlling the aircraft to fly to the photographing location based on the photographing information may include: determining the photographing location of the aircraft relative to the photographing object based on the photographing information, and controlling the aircraft to fly to the photographing location.

In some embodiments, the control method of FIG. 2 may also include: determining a predetermined image composition rule that the photographing object needs to satisfy in the image to be captured. In some embodiments, controlling the aircraft to fly to the photographing location based on the photographing information may include: controlling the aircraft to fly to the photographing location based on the predetermined image composition rule and the photographing information.

Alternatively or additionally, in some embodiments, the control method of FIG. 2 may also include: determining a flight direction of the aircraft after the aircraft takes off Determining the photographing location of the aircraft relative to the photographing object based on the photographing information may include: determining a flight distance after the aircraft takes off based on the photographing information, and determining the photographing location based on the flight direction and the flight distance. For example, the flight distance may be a horizontal distance between the photographing object and the photographing location. The flight direction and the flight distance may determine the height of the photographing location. Accordingly, the disclosed method may include determining the height of the photographing location based on the flight direction and flight distance.

In some embodiments, the present disclosure does not limit the methods for determining the flight direction. For example, the flight direction after the aircraft takes off may be determined using one or more of the following methods:

1) determining the flight direction based on the settings configured prior to the takeoff of the aircraft. For example, prior to the takeoff, the flight direction may be set as toward an upper left direction, an upper right direction, or an upper front direction, etc.

2) determining the flight direction based on the heading direction of the aircraft head when the aircraft takes off. For example, if the aircraft is thrown to fly in the upper left direction or the upper right direction, the flight direction may be determined as the upper left direction or the upper right direction, accordingly.

3) determining the flight direction based on a location of the takeoff. For example, if the location of the aircraft at taking off is relatively low, then the flight direction may point to a relatively low direction. If the location of the aircraft at taking off is relatively high, then the flight direction may point to a relatively high direction.

4) determining the flight direction based on the location of the photographing object. For example, if the photographing object is located on a moving object (e.g., a moving vehicle), then the flight direction may point to the movement direction of the photographing object.

5) determining the flight direction based on the facing direction of the photographing object. For example, if the aircraft determines, based on the detected attitude of the photographing object, that the photographing object faces the upper left direction, then the aircraft may determine the upper left direction as the flight direction.

6) determining the flight direction based on a selected photographing angle. For example, a user may determine or select the photographing angle prior to the takeoff of the aircraft, and the aircraft may determine the flight direction based on photographing angle.

Alternatively or additionally, in some embodiments, the control method of FIG. 2 may also include: determining photographing parameters of the imaging device for capturing images of the photographing object. In some embodiments, determining the photographing location of the aircraft relative to the photographing object based on the photographing information may include: determining a flight distance of the aircraft after takeoff based on the photographing information; and determining the photographing location based on the flight distance and the photographing parameters of the imaging device. For example, the photographing parameters may include at least one of a field of view ("FOV") parameter and a focal length parameter. For different FOV parameters or different local length parameters, and given the same scene, the photographing locations determined based on the different FOV parameters or the different focal length parameters may be different. In some embodiments, the focal length parameter may be the focal length, the FOV parameter may be the FOV angle. In some embodiments, for the same scene, the longer the focal length, the larger the photographing distance. The larger the FOV angle, the shorter the photographing distance.

In some embodiments, the disclosed method may include determining the photographing location based on the flight distance, the photographing parameters of the imaging device, and the flight direction.

Alternatively or additionally, in some embodiments, the photographing object may include multiple main bodies. Determining the photographing location of the aircraft relative to the photographing object based on the photographing information may include: determining the photographing location of the aircraft based on the number of the main bodies and the photographing information. For example, the larger the number of the main bodies of the photographing object, the farther the distance between the photographing location and the photographing object.

Figure 3:
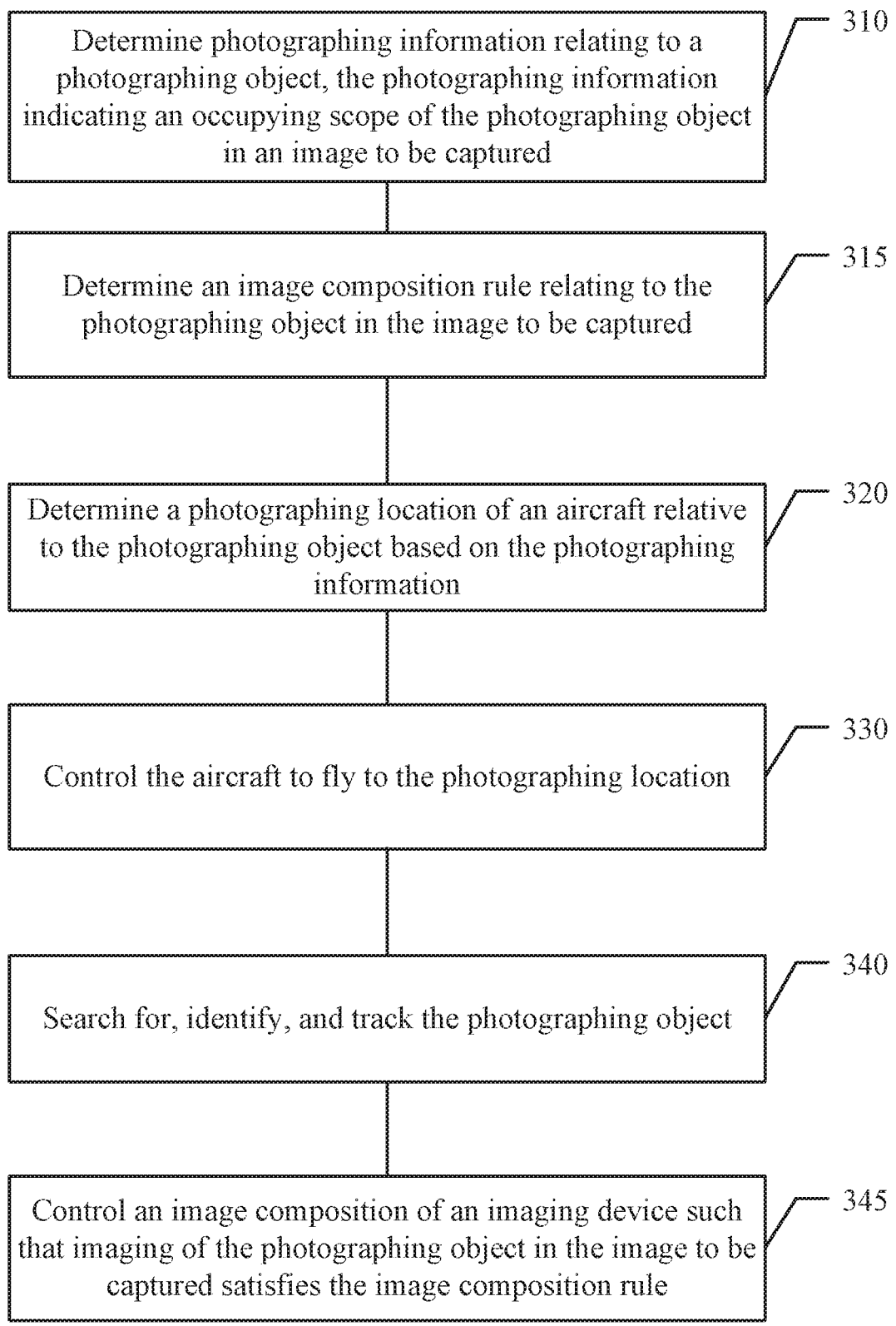
FIG. 3 is a flow chart illustrating a method for controlling an aircraft, according to another example embodiment.

FIG. 3 is a flow chart illustrating a control method for controlling an aircraft according to an embodiment of the present disclosure. The control method of FIG. 3 may be an embodiment of the control method of FIG. 2. The control method of FIG. 3 may include:

Step 310: determining photographing information relating to a photographing object, the photographing information indicating an occupying scope of the photographing object in an image to be captured. This step may be similar to step 210.

Step 315: determining an image composition rule relating to the photographing object in the image to be captured.

For example, prior to the takeoff of the aircraft, the aircraft may receive an image composition rule input by a user. Alternatively or additionally, the aircraft may determine the image composition rule based on a detected hand gesture of the user.

In some embodiments, the image composition rule may include one or more of a location of the photographing object in the image to be captured, an angle of a face of the photographing object in the image to be captured, or a degree of integrity of the face of the photographing object in the image to be captured.

In some embodiments, when the image composition rule includes a location of the photographing object in the image to be captured, the image composition rule may include at least one of a balanced composition, a symmetric composition, a diagonal composition, a triangular composition, a nine-square composition, a centripetal composition, a division composition. When the image composition rule includes the angle of the face of the photographing object in the image to be captured, the image composition rule may include a front view of the face of the human in the image to be captured, or a side view of the face of the human in the image to be captured. When the image composition rule includes a degree of integrity of the face of the photographing object in the image to be captured, the image composition rule may include a partial image of the face of the photographing object or a complete image of the face of the photographing object.

In some embodiments, the present disclosure does not limit the execution order of steps 310 and 315. Steps 310 and 315 may be executed simultaneously or step 315 may be executed before step 310.

Step 320: determining a photographing location of an aircraft relative to the photographing object based on the photographing information.

In some embodiments, the flight control device may be configured to estimate the photographing distance based on a relationship between the occupying scope of the photographing object in the image to be captured and a distance between the photographing object and the photographing location (i.e., the photographing distance). The smaller the occupying scope of the photographing object in the image to be captured, the farther the photographing distance, and vice versa. For example, the flight control device may calculate the photographing distance using a predetermined algorithm based on a user expected occupying scope of the photographing object in the image to be captured. In some embodiments, the relationship between the occupying scope of the photographing object in the image to be captured and the photographing distance may be pre-set in a table. The flight control device may determine the photographing distance based on the table and the user expected occupying scope of the photographing object in the image to be captured.

Step 330: controlling the aircraft to fly to the photographing location.

For example, the photographing location may be determined based on the photographing distance. The aircraft may fly under a pointing-flight mode, in which the flight control device may control the aircraft to fly along a straight path to the photographing location or may control the aircraft to fly while circumventing any obstacles on the flight path to the photographing location.

In some embodiments, the aircraft may automatically start the flight using various methods, as described above in connection with the embodiment of FIG. 2.

Step 340: searching for, identifying, and tracking the photographing object.

For example, the flight control device may receive, in real time, images transmitted from the imaging device or other vision sensors carried by the aircraft. The flight control device may search for and identify a predetermined characteristic image of the photographing object in the received images, and may track the photographing object.

Step 345: controlling an image composition of an imaging device, such that imaging of the photographing object in the image to be captured satisfies the image composition rule.

For example, after detecting the photographing object, the flight control device may control the imaging device to intelligently compose the image. For example, if the imaging device is capturing an image of a single human, the image composition may use the typical nine-square image composition. The flight control device may adjust, in real time, the location and heading direction (or facing direction) of the aircraft based on results fed back from a facial recognition algorithm and a tracking algorithm, such that the imaging device can capture images of the front view of the face of the photographing object.

In some embodiments, the flight control device may control the image composition of the imaging device through adjusting at least one of the flight attitude of the aircraft, the gimbal of the imaging device, or the focal length of the imaging device, such that the location of the photographing object in the image to be captured satisfies the predetermined image composition rule.

For example, in some embodiments, the flight control device may control a rotating speed of the propeller of the aircraft to adjust the flight attitude of the aircraft. For example, the aircraft may adjust the flight attitude through flight actions such as roll, yaw, and/or pitch. In some embodiments, the flight control device may adjust the motion of the gimbal through controlling the rotation of the roll mechanism, yaw mechanism, and/or pitch mechanism of the gimbal. These adjustments and controls cause the imaging device to move along with the aircraft or the gimbal relative to the photographing object, thereby adjusting the image composition of the photographing object in the image to be captured. In some embodiments, the focal length of the imaging device may be adjusted during the photographing process, such that a clear image composition may be obtained.

In some embodiments, the control method of FIG. 3 may also include: capturing images of the photographing object when imaging of the photographing object in the image to be captured satisfies the predetermined image composition rule.

For example, when determining, based on a result of image recognition, that a center of the photographing object coincides or overlaps with a crossing point of the nine-square grid, an instruction may be sent to the imaging device to instruct the imaging device to capture images of the photographing object.

In some embodiments, the flight control device may estimate the photographing location of the aircraft relative to the photographing object based on the user expected occupying scope of the photographing object in the image to be captured. The flight control device may control the aircraft to fly to the photographing location. The imaging device may intelligently compose the image based on the predetermined image composition rule and start capturing images. The disclosed method reduces the manual interference of the aircraft during the photographing process, thereby enhancing the user experience. In addition, the disclosed method reduces the time spent in manual operations in the overall flight time, thereby increasing the continuous flight capability of the aircraft.

Figure 4:
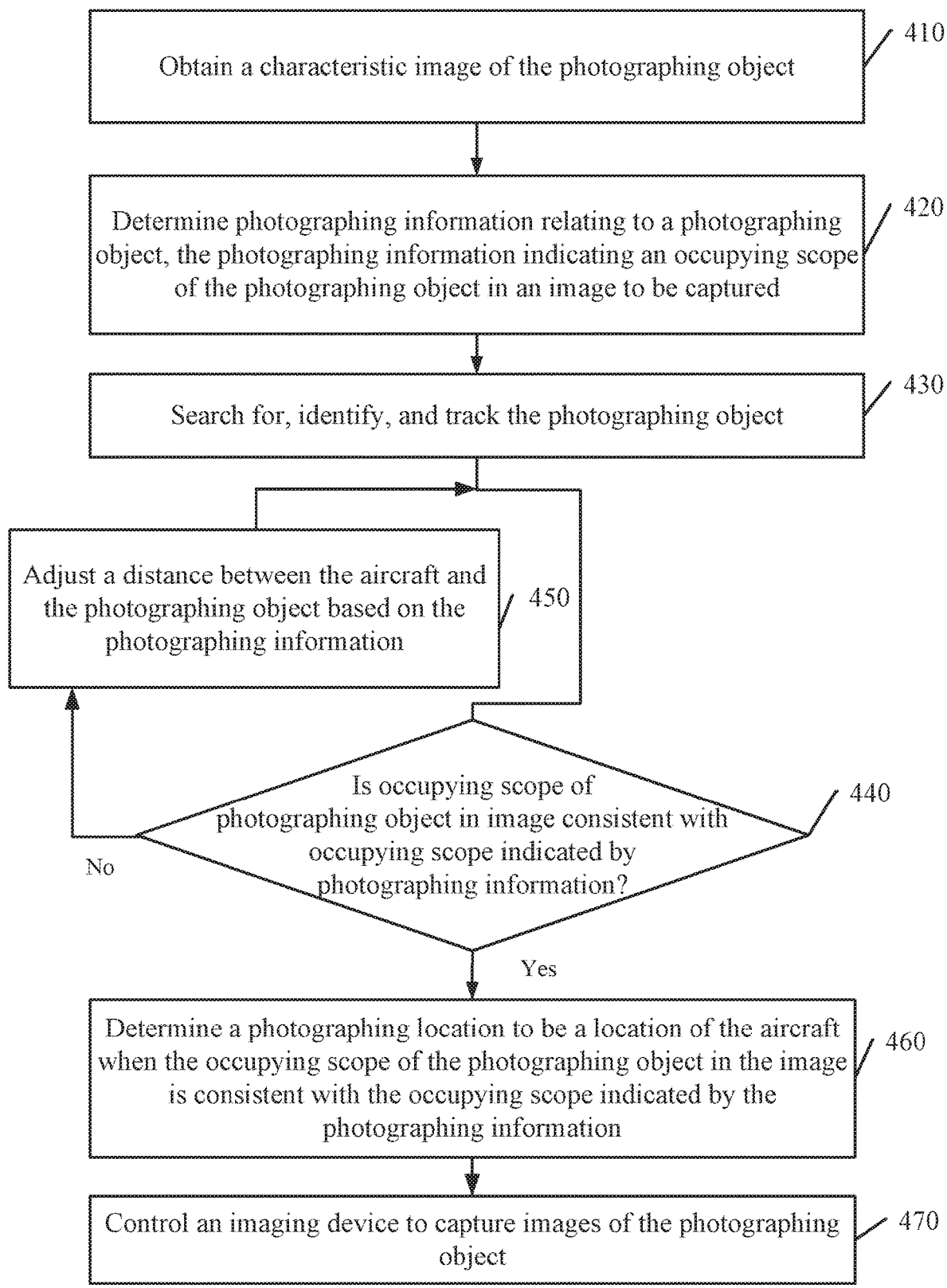
FIG. 4 is a flow chart illustrating a method for controlling an aircraft, according to another example embodiment.

FIG. 4 is a flow chart illustrating a control method for controlling the aircraft according to an embodiment of the present disclosure. The control method of FIG. 4 may be an embodiment of the control method of FIG. 2. The control method of FIG. 4 may include the following steps.

Step 410: obtaining a characteristic image of the photographing object.

For example, prior to the takeoff, the flight control device may control the imaging device to capture one or more images of the photographing object to obtain a characteristic image (e.g., an image of facial characteristics). As another example, the characteristic image of the photographing object may be obtained from an external device (e.g., a user terminal).

Step 420: determining photographing information relating to the photographing object, the photographing information indicating an occupying scope of the photographing object in an image to be captured. Step 420 may be the same as step 210.

The present disclosure does not limit the execution order or sequence of the steps 410 and 420. The two steps may be executed simultaneously or step 420 may be executed prior to step 410.

Step 430: searching for, identifying, and tracking the photographing object.

For example, after takeoff, the flight control device may receive, in real time, images transmitted from the imaging device or other vision sensors carried by the aircraft. The flight control device may search for and identify predetermined characteristic image(s) of the photographing object in the received images, and may track the photographing object.

A person having ordinary skill in the art can appreciate that the aircraft may be automatically started to fly using various methods, as described above in connection with FIG. 2.

Step 440: after searching for and identifying the photographing object, detecting or determining whether the occupying scope of the photographing object in the current image is consistent with the occupying scope indicated by the photographing information. If they are not consistent (No, step 440), step 450 is executed. If they are consistent (Yes, step 440), step 460 is executed.

For example, after the aircraft is thrown to fly, the proportion that the photographing object occupies the current image may be obtained using image recognition. The flight control device may determine whether the proportion is consistent with the proportion indicated by the photographing information.

Step 450: adjusting a distance between the aircraft and the photographing object based on the photographing information, and continuing to execute step 440.

For example, if the proportion that the photographing object occupies the current image is greater than the proportion indicated by the photographing information, the flight control device may adjust the aircraft to fly away from the photographing object. If the proportion that the photographing object occupies the current image is smaller than the proportion indicated by the photographing information, the flight control device may adjust the aircraft to fly closer to the photographing object. The above adjustments may be performed using a fixed step size or varying step sizes.

Step 460: determining a photographing location to be a location of the aircraft when the occupying scope of the photographing object in the image is consistent with the occupying scope indicated by the photographing information.

For example, when the proportion of the photographing object in the current image is consistent with the proportion indicated by the photographing information, the current location of the aircraft may be set as the photographing location.

Step 470: controlling the imaging device to capture images of the photographing object.

In some embodiments, the image composition of the imaging device may be controlled such that the imaging of the photographing object in the image to be captured satisfies the predetermined image composition rule. The imaging device may be controlled to capture images of the photographing object when the imaging of the photographing object in the image to be captured satisfies the predetermined image composition rule.

Figure 5:
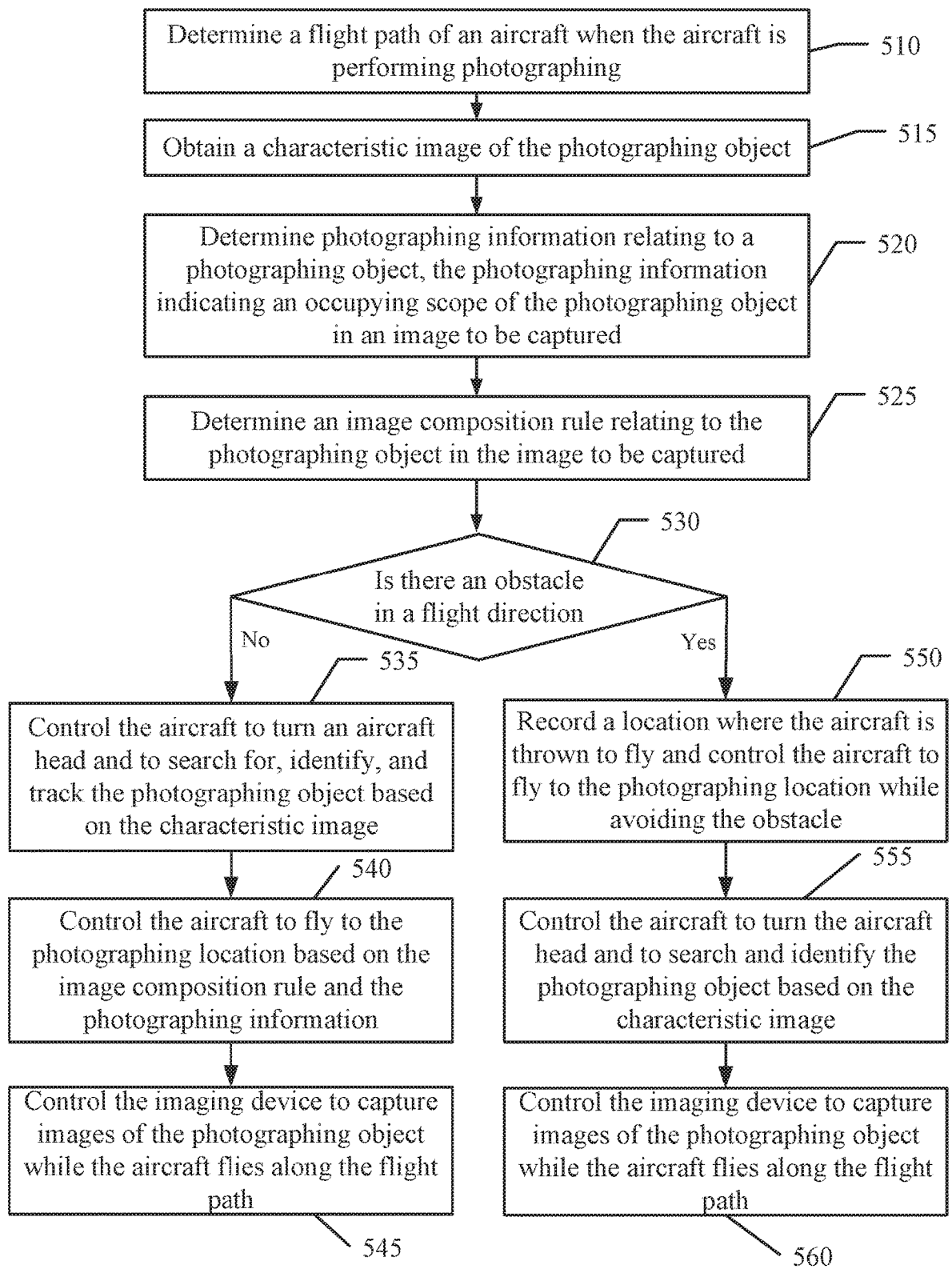
FIG. 5 is a flow chart illustrating a method for controlling an aircraft, according to another example embodiment.

FIG. 5 is a flow chart illustrating a control method for controlling the aircraft according to an embodiment of the present disclosure. The control method of FIG. 5 may be an embodiment of the control method of FIG. 2. The control method of FIG. 5 may include the following steps.

Step 510: determining a flight path of an aircraft when the aircraft is performing photographing.

In some embodiments, prior to the takeoff, the user may manually operate the aircraft or an external device. The flight control device may receive motion data detected by one or more sensors carried by the aircraft or the external device. The flight control device may determine a user expected flight path for the photographing process based on the motion data. Thus, the aircraft may determine the flight path for the photographing process based on simple actions of the user, thereby reducing manual operations of the aircraft through an external device (e.g., a user terminal or remote control device) during the photographing process. As a result, the user experience can be enhanced, electrical energy consumption can be reduced, and the continuous flight capability of the aircraft can be increased. The methods for determining the flight path have been discussed above in connection with FIG. 2.

Step 515: obtaining a characteristic image of the photographing object. This step may be the same as step 410.

Step 520: determining photographing information relating to a photographing object, the photographing information indicating an occupying scope of the photographing object in an image to be captured. This step may be the same as step 210.

Step 525: determining an image composition rule relating to the photographing object in the image to be captured. This step may be the same as step 315.

Step 530: after the aircraft is thrown to fly, determining whether there is an obstacle in a flight direction. If there is no obstacle (No, step 530), step 535 is executed. If there is an obstacle (Yes, step 530), then step 550 is executed.

In some embodiments, at the moment the aircraft is thrown out to fly, the flight control device may determine, through the sensor systems of the aircraft, whether the flight direction is safe. For example, a distance measuring sensor of the aircraft may detect whether there is an obstacle within a predetermined distance range (e.g., within 6-7 meters). The predetermined distance range may be an empirical value, and may be related to photographing parameters of the imaging device. For example, the predetermined distance value may be adjusted based on different models or types of the imaging devices.

A person having ordinary skill in the art can appreciate that the aircraft may be automatically started to fly using various methods, as described above in connection with FIG. 2.

Step 535: if there is no obstacle in the flight direction, controlling the aircraft to turn an aircraft head and to search for, identify, and track the photographing object based on the characteristic image obtained earlier.

If there is no obstacle in the flight direction, the flight control device may control the aircraft to reverse the heading direction of the aircraft head to point to a direction opposite the initial flight direction, such that the lens of the imaging device faces the photographing object. The flight control device may control the imaging device to search for and identify the photographing object based on the facial characteristics recorded in step 515. Once the photographing object is found, the flight control device may control the imaging device to track the photographing object by locking the face of the photographing object based on a tracking algorithm, determine the photographing object, and search the entire body of the photographing object using a human detector to determine the main body of the photographing object.

For example, in some embodiments, the flight control device may receive images transmitted from the imaging device or other vision sensors. The flight control device may search for and identify the characteristic image determined in step 515 in the received images. Any suitable methods for searching for and identifying the characteristic image may be used.

Step 540: controlling the aircraft to fly to the photographing location based on the image composition rule and the photographing information.

In some embodiments, after searching for and identifying the photographing object, the flight control device may adjust the location of the photographing object in the image to be captured based on the predetermined image composition rule. The flight control device may also adjust the distance between the aircraft and the photographing object, such that the proportion that the photographing object occupies the image to be captured tends to be consistent with the proportion that the photographing object occupies the image to be captured as indicated by the photographing information, and eventually satisfies the predetermined image composition rule.

In some embodiments, when the image composition is adjusted, the distance between the aircraft and the photographing object may be adjusted simultaneously. In some embodiments, adjusting the image composition and adjusting the distance between the aircraft and the photographing object may be performed in any sequence. For example, the aircraft may be controlled to fly to a suitable photographing location and then the image composition is adjusted. Alternatively, the image composition is adjusted, then the aircraft is controlled to fly to the suitable photographing location.

Step 545: controlling the imaging device to capture images of the photographing object while the aircraft flies along the flight path.

For example, if the aircraft determines that the flight path is a circular path, the aircraft may circle around the photographing object while capturing images of the photographing object during the photographing process. If the aircraft determines that the flight path is a path for pulling-closer photographing, during the photographing process the aircraft may face the photographing object and capture images of the photographing object while flying along the flight path.

In some embodiments, to realize a from-near-to-far long motion scene, the aircraft may use a straight line flight path. As a result, spatial connection and switch may be naturally realized when the lens moves along the straight line flight path, and the transfer between regional views (e.g., focusing on photographing object) and complete views (e.g., the entire scene) may be naturally realized. This type of long motion scene self-photographing method is also referred to as Dronies (Drone Selfies). Conventionally, Dronies are realized through manual controls. The user need to manually control the aircraft to fly along a relatively straight line, and simultaneously control the lens to place the photographing object at the center of the images. The manual controls place a strong requirement on the flight control skills of the user, which most ordinary users do not have. The present disclosure can capture similar images using intelligent photographing methods disclosed herein.

Step 550: if there is an obstacle in the flight direction, recording a location where the aircraft is thrown to fly and controlling the aircraft to fly to the photographing location while avoiding the obstacle.

If there is an obstacle in the flight direction, the location and height of the point where the aircraft is thrown to fly can be obtained through a location sensor, such as a GPS sensor or a vision sensor. The location and height of the thrown-to-fly point may be recorded. In such situations, the aircraft may plan the flight path to circumvent the obstacle. If it is not possible to circumvent the obstacle, the aircraft may attempt increasing the flight height to avoid the obstacle. In some embodiments, during the flight, the aircraft head may face the forward moving direction to ensure flight safety.

Step 555: controlling the aircraft to turn the aircraft head and to search for and identify the photographing object based on the location where the aircraft is thrown to fly and previously obtained characteristic image.

In some embodiments, after the aircraft flies to the photographing location, the flight control device may control the aircraft to turn the aircraft head (e.g., reverse the heading direction), and identify facial characteristics based on information of the current location and the recorded location and height of the thrown-to-fly point. The flight control device may further detect the entire body of the photographing object using a human detector.

Alternatively or additionally, in some embodiments, the flight control device may determine, in real time after the aircraft is thrown to fly, whether there is an obstacle in the flight direction. After determining that the there is no obstacle, the flight control device may control the aircraft to turn the aircraft head (e.g., reverse the heading direction), and search for and identify the photographing object. In other words, the flight control device may control the aircraft to search for, identify, and track the photographing object while flying backwardly.

Step 560: controlling the imaging device to capture images of the photographing object while the aircraft flies along the flight path.

In some embodiments, step 560 may also include controlling the image composition of the imaging device, such that the imaging of the photographing object in the image to be captured satisfies the predetermined image composition rule. When the imaging of the photographing object in the image to be captured satisfies the predetermined image composition rule, the imaging device may capture images of the photographing object.

In some embodiments, in steps 540 and 555, the aircraft may not turn the aircraft head. Instead, the aircraft may maintain the aircraft head to point to the flight direction, and rotate the gimbal to realize the searching for, identifying, and tracking of the photographing object.

According to the present disclosure, the aircraft may automatically search for, identify, and track the photographing object based on the characteristic image obtained by the imaging device, and may automatically compose the image. After the aircraft is thrown out to fly, the flight control device may control the aircraft to fly to a photographing location to perform a series of continuous photographing based on a predetermined image composition rule and photographing information. The operations of the aircraft is simple and straightforward, and there is no need to use a remote control device or a user terminal to operate the aircraft during the photographing process. The aircraft may plan a flight path based on a user's expectation of the photographing process. The entire photographing process may become smoother, and the user experience may be enhanced.

The above described the control methods of the present disclosure. Next, the control device for controlling the aircraft, control apparatus for controlling the aircraft, and the aircraft will be described with reference to FIG. 6 to FIG. 8.

The present disclosure also provides a non-transitory computer storage medium (e.g., memory or other storage devices, such as hard disks) configured to store computer instructions or codes. The computer instructions or codes, when executed by a processor, cause the processor to perform some or all of the steps of the control methods shown in FIG. 2-FIG. 5.

Figure 6:
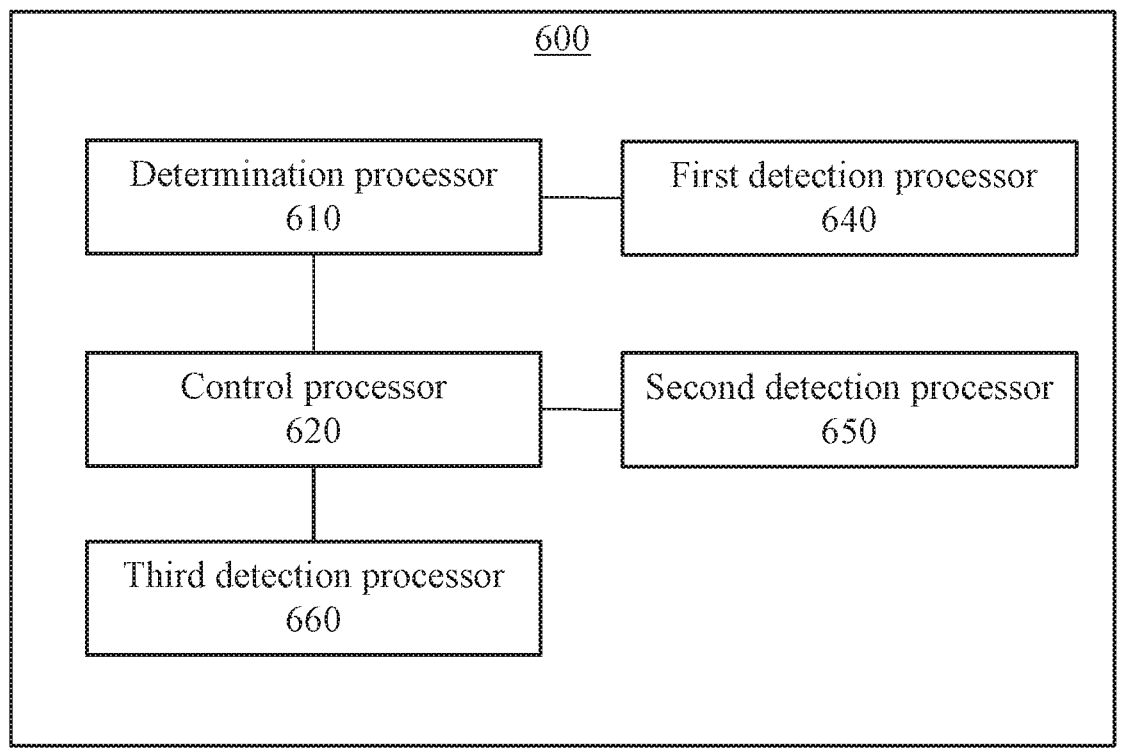
FIG. 6 is a schematic diagram of a control device for controlling the aircraft, according to an example embodiment.

FIG. 6 is a schematic diagram of a control device 600 for controlling an aircraft. The control device 600 of the aircraft may be an embodiment of the flight control device 161 shown in FIG. 1. The control device 600 of the aircraft may include a determination processor 610 and a control processor 620.

The determination processor 610 may be configured to determine photographing information relating to the photographing object. The photographing information may indicate an occupying scope of the photographing object in an image to be captured. The control processor 620 may be configured to control the aircraft to fly to a photographing location based on the photographing information.

In some embodiments, the control device 600 may control the aircraft to fly to a suitable photographing location based on a user expected occupying scope of the photographing object in the image to be captured, thereby reducing the manual interference of the aircraft during the photographing process. User experience may be enhanced. In addition, time spent in manual operations may be reduced in the overall flight time, which in turn increases the continuous flight capability of the aircraft.

In some embodiments, the photographing information may include at least one of a large scene, a medium scene, or a small scene. In some embodiments, the photographing information may include at least one of a whole body image, a greater-than-half-body image, a half body image, a chest image, a head-and-shoulder image, or a big-head image.

In some embodiments, the control processor 620 may be configured to determine a photographing location of the aircraft relative to the photographing object based on the photographing information, and control the aircraft to fly to the photographing location.

In some embodiments, the determination processor 610 may be configured to capture an image of the photographing object, and determine the photographing object based on the captured image.

In some embodiments, the determination processor 610 may be configured to control the imaging device to capture images of the photographing object prior to the takeoff of the aircraft. In some embodiments, the determination processor 620 may control the imaging device to capture images of the photographing object after the takeoff of the aircraft. In some embodiments, the determination processor 610 may receive images of the photographing object transmitted from an external device.

Alternatively or additionally, in some embodiments, the control processor 620 may be configured to control the imaging device carried by the aircraft to capture images of the photographing object after the aircraft flies to the photographing location.

In some embodiments, the control processor 620 may be configured to control the imaging device to adjust the focal length of the imaging device based on the depth of field principle, and capture images of the photographing object using the adjusted focal length.

In some embodiments, the control processor 620 may be configured to control the image composition of the imaging device, such that the imaging of the photographing object in the image to be captured satisfies the image composition rule. The control processor may control the imaging device to capture images of the photographing object when the imaging of the photographing object in the image to be captured satisfies the image composition rule.

In some embodiments, the control processor 620 may be configured to adjust at least one of the flight attitude of the aircraft, the motion of the gimbal of the imaging device, or the focal length of the imaging device to control the image composition of the imaging device, such that the location of the photographing object in the image to be captured satisfies the image composition rule.

In some embodiments, the determination processor 610 may be configured to determine a flight path of the aircraft when capturing images of the photographing object. The control processor 620 may be configured to control the aircraft to fly along the flight path while capturing images of the photographing object.

In some embodiments, the determination processor 610 may be configured to determine the flight path based on an input received from an external device.

In some embodiments, the determination processor 610 may detect the motion of the aircraft based on a motion sensor of the aircraft, obtain first motion data from the motion sensor, and determine the flight path based on the first motion data.

In some embodiments, the determination processor 610 may receive second motion data from a motion sensor of the external device that detects a motion of the external device, and may determine the flight path based on the second motion data.

In some embodiments, the sensors may include at least one of a gyroscope, a digital compass, an IMU, an accelerometer, a global navigation satellite system, or a vision sensor.

In some embodiments, the motion may include at least one of a circling motion, a pulling-away motion, a pulling-closer motion, or an S-shaped motion.

Alternatively or additionally, in some embodiments, the motion is a circling motion. The control device 600 may also include a second detection processor 650 configured to detect a rotation around the pitch axis of the gimbal of the aircraft prior to the takeoff of the aircraft. The determination processor 610 may determine that the flight path is a spiral ascent or a spiral descent based on the detected rotation around the pitch axis and the circling motion.

In some embodiments, the motion may include at least one of a motion in a vertical plane and a motion in a horizontal plane.

Alternatively or additionally, in some embodiments, prior to determining the flight path of the aircraft, the determination processor 610 may determine whether a signal for activating the determination of the flight path has been received. The signal may be configured to activate the determination of the flight path of the aircraft.

In some embodiments, the determination processor 610 may determine that the flight path is a tracking flight if a flight path is not input within a predetermined time period.

In some embodiments, the flight path may include at least one of a circling, a pulling-away, a pulling-closer, or an S-shape flight path.

Alternatively or additionally, in some embodiments, the control processor 620 may be configured to automatically start the aircraft when the aircraft satisfies a predetermined automatic start condition.

In some embodiments, the control processor 620 may be configured to detect third motion data of the aircraft when the aircraft is thrown to fly, and may automatically start the propulsion device of the aircraft when the third motion data satisfy the predetermined automatic start condition.

In some embodiments, the motion data may include a distance that the aircraft is thrown out. The third motion data may satisfy the predetermined automatic start condition when the distance that the aircraft is thrown out is greater than or equal to a first predetermined value. Alternatively or additionally, the third motion data may include a vertical velocity or a velocity of the aircraft. The third motion data may satisfy the predetermined automatic start condition when the vertical velocity or velocity of the aircraft is smaller than or equal to a second predetermined value.

In some embodiments, the first predetermined value is zero or the first predetermined value is a safe distance between the aircraft and the user.

In some embodiments, before the aircraft is thrown out to fly, the control processor 620 may be configured to start the propulsion device and control the propulsion device to rotate in an idling state when the aircraft satisfies an idling condition.

In some embodiments, the control processor 620 may be configured to control the propulsion device to rotate in the idling state after unlocking the aircraft using facial recognition. Alternatively or additionally, the control processor 620 may control the propulsion device to rotate in the idling state after the aircraft has been placed in a horizontal state for more than a predetermined time period. Alternatively or additionally, the control processor 620 may control the propulsion device to rotate in the idling state after confirming receipt of a signal permitting the rotation in the idling state.

In some embodiments, the control processor 620 may detect fourth motion data prior to the takeoff of the aircraft. The control processor 620 may automatically start the propulsion device of the aircraft when the fourth motion data satisfy the predetermined automatic start condition.

In some embodiments, the fourth motion data may indicate a time period within which an attitude angle of the aircraft has been within a predetermined value range. The fourth motion data may satisfy the predetermined automatic start condition when the time period is greater than the second predetermined value.

In some embodiments, the control processor 620 may be configured to search for and identify the photographing object through the imaging device of the aircraft. After searching for and identifying the photographing object, the control processor 620 may be configured to determine whether an occupying scope of the photographing object in the current image is consistent with an occupying scope indicated by the photographing information. When the occupying scope of the photographing object in the current image is consistent with the occupying scope indicated by the photographing information, the control processor 620 may be configured to determine the photographing location to be the current location of the aircraft.

In some embodiments, the control processor 620 may be configured to control the aircraft head or the gimbal of the aircraft when determining that there is no obstacle ahead of the aircraft, such that the imaging device may face the takeoff location. The control processor 620 may control the imaging device to search for and identify the photographing object.

In some embodiments, when the control processor 620 determines that there is an obstacle ahead of the aircraft, the control processor 620 may control the aircraft to circumvent the obstacle, and to turn the aircraft head (e.g., reverse the heading direction) or the gimbal of the aircraft, such that the imaging device faces the takeoff location. The control processor 620 may control the imaging device to search for and identify the photographing object.

Alternatively or additionally, in some embodiments, the determination processor 610 may be configured to determine a flight direction of the aircraft after takeoff. For example, the determination processor 610 may be configured to determine a flight distance after takeoff based on the photographing information, and determine a photographing location based on the flight direction and the flight distance.

In some embodiments, the determination processor 610 may determine a flight direction based on settings of the aircraft configured before takeoff. Alternatively or additionally, the determination processor 610 may determine the flight direction based on the heading direction of the aircraft head when the aircraft takes off. Alternatively or additionally, the determination processor 610 may determine the flight direction based on the location when the aircraft takes off. Alternatively or additionally, the determination processor 610 may determine the flight direction based on the location of the photographing object. Alternatively or additionally, the determination processor 610 may determine the flight direction based on the facing direction of the photographing object. Alternatively or additionally, the determination processor 610 may determine the flight direction based on a selected photographing angle.

Alternatively or additionally, in some embodiments, the determination processor 610 may be configured to determine photographing parameters of the imaging device that are used for capturing images of the photographing object. For example, the determination processor 610 may determine a flight distance after the aircraft takes off based on the photographing information, and determine a photographing location based on the flight distance and the photographing parameters of the imaging device.

In some embodiments, the photographing parameters may include at least one of an FOV parameter or a focal length parameter.

Alternatively or additionally, in some embodiments, the determination processor 610 may be configured to determine an image composition rule that the photographing object has to satisfy in the image to be captured. The control processor 620 may be configured to control the aircraft to fly to the photographing location based on the predetermined image composition rule and the photographing information.

In some embodiments, the image composition rule may include one or more of a location of the photographing object in the image to be captured, an angle of the face of the photographing object in the image to be captured, and a degree of integrity of the face of the photographing object in the image to be captured.

Alternatively or additionally, in some embodiments, the determination processor 610 may be configured to receive a predetermined image composition rule from an external device, or determine the image composition rule based on recognition of a predetermined action or gesture of the photographing object.

In some embodiments, the image composition rule may include at least one of a balanced composition, a symmetric composition, a diagonal composition, a triangular composition, a nine-square composition, a centripetal composition, a division composition, a front view of the face of the human in the image to be captured, or a side view of the face of the human in the image to be captured.

In some embodiments, the determination processor 610 may determine the photographing information based on an input received from an external device.

In some embodiments, the photographing object may include multiple main bodies, and the determination processor 610 may be configured to determine the photographing location based on the number of the main bodies and the photographing information.

Alternatively or additionally, in some embodiments, a first detection processor 640 may be configured to detect at least one of a velocity of the aircraft, an acceleration, or a thrown-to-fly path when the aircraft is thrown to fly. The determination processor 610 may be configured to select the photographing information from multiple types of predetermined photographing information based on at least one of the velocity, acceleration, or thrown-to-fly path.

Alternatively or additionally, in some embodiments, the control device 600 of the aircraft may also include a third detection processor 660 configured to detect status information of the environment and/or gesture information of the photographing object. In some embodiments, the control processor 620 may be configured to adjust the photographing angle based on the status information of the environment and/or the gesture information of the photographing object.

The operations and functions of the control device 600 of the aircraft may refer to the above descriptions of the control methods of FIG. 2 to FIG. 5.

Figure 7:
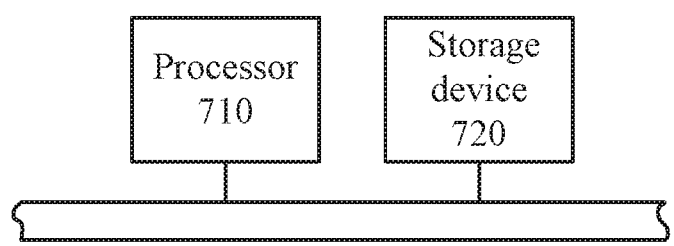
FIG. 7 is a schematic diagram of a control device for controlling the aircraft, according to another example embodiment.

FIG. 7 is a schematic diagram of a control device 700 of the aircraft. The control device 700 may include a processor 710 and a storage device 720, such as a memory.

The storage device 720 may be configured to store instructions for the processor 710 to execute to perform any method of FIG. 2 to FIG. 5.

Figure 8:
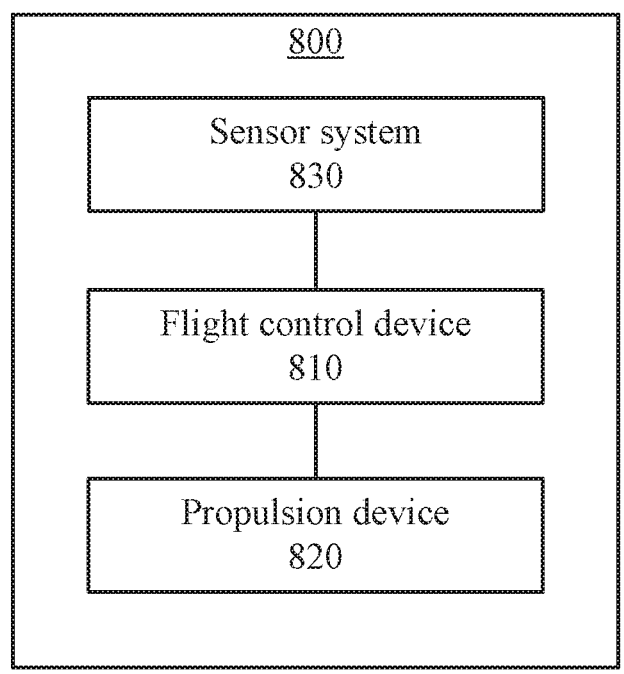
FIG. 8 is a schematic diagram of an aircraft, according to an example embodiment.

FIG. 8 is a schematic diagram of an aircraft 800. The aircraft 800 may include a flight control device 810, one or more propulsion devices 820, and a sensor system 830. The sensor system 830 may be configured to detect motion parameters of the aircraft 800. The one or more propulsion devices 820 may be configured to provide a flight propulsion for the aircraft 800. The control device 810 may be communicatively coupled with the one or more propulsion devices 820, and the sensor system 830. The control device 810 may be configured to control the one or more propulsion devices 820, thereby controlling the flight of the aircraft 800, based on hand motion or gesture parameters detected by the sensor system 830. The flight control device 810 may be the control device of FIG. 7. The propulsion device 820 may be the propulsion system of FIG. 1.

A person having ordinary skill in the art can appreciate that units and algorithms of the disclosed methods and processes may be implemented using electrical hardware, or a combination of electrical hardware and computer software. Whether the implementation is through hardware or software is to be determined based on specific application and design constraints. A person of ordinary skill in the art may use different methods to realize different functions for each specific application. Such implementations fall within the scope of the present disclosure.

A person having ordinary skill in the art can appreciate that descriptions of the functions and operations of the system, device, and unit can refer to the descriptions of the disclosed methods.

A person having ordinary skill in the art can appreciate that the various system, device, and method illustrated in the example embodiments may be implemented in other ways. For example, the disclosed embodiments for the device are for illustrative purpose only. Any division of the units are logic divisions. Actual implementation may use other division methods. For example, multiple units or components may be combined, or may be integrated into another system, or some features may be omitted or not executed. Further, couplings, direct couplings, or communication connections may be implemented using interfaces. The indirect couplings or communication connections between devices or units or components may be electrical, mechanical, or any other suitable type.

In the descriptions, when a unit or component is described as a separate unit or component, the separation may or may not be physical separation. The unit or component may or may not be a physical unit or component. The separate units or components may be located at a same place, or may be distributed at various nodes of a grid or network. The actual configuration or distribution of the units or components may be selected or designed based on actual need of applications.

Various functional units or components may be integrated in a single processing unit, or may exist as separate physical units or components. In some embodiments, two or more units or components may be integrated in a single unit or component. The integrated units may be realized using hardware, or may be realized using hardware and software functioning unit.

The disclosed functions may be realized using software functioning units and may be sold or used as an independent product. The software functioning units may be stored in a computer-readable medium as instructions or codes, such as a non-transitory computer-readable storage medium. Thus, the disclosed methods may be realized using software products. The computer software product may be stored in the computer-readable medium in the form of codes or instructions, which are executable by a computing device (e.g., a personal computer, a server, or a network device, etc.) or a processor to perform all or some of the steps of the disclosed methods. The non-transitory computer-readable storage medium can be any medium that can store program codes, for example, a USB disc, a portable hard disk, a read-only memory ("ROM"), a random access memory ("RAM"), a magnetic disk, an optical disk, etc.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A method for controlling an aircraft, comprising:
   determining photographing information related to a photographing object, the photographing information indicating an occupying scope of the photographing object in an image to be captured; and controlling the aircraft to fly to a photographing location based on the photographing information, including:
  searching for and identifying the photographing object through the imaging device of the aircraft;
  in response to searching for and identifying the photographing object, detecting whether an occupying scope of the photographing object in an image to be captured is consistent with the occupying scope indicated by the photographing information; and
  determining the photographing location to be a current location of the aircraft when the occupying scope of the photographing object in the image to be captured is consistent with the occupying scope indicated by the photographing information.

2. The method of claim 1, further comprising:
obtaining an image of the photographing object; and
determining the photographing object based on the image.

3. The method of claim 2, wherein obtaining the image of the photographing object further comprises:
  controlling an imaging device to capture the image of the photographing object prior to takeoff of the aircraft; or
  controlling the imaging device to capture the image of the photographing object after the aircraft takes off; or
  receiving the image of the photographing object from an external device.

4. The method of claim 3, further comprising:
  controlling the imaging device carried by the aircraft to capture the image of the photographing object after the aircraft flies to the photographing location.

5. The method of claim 4, wherein controlling the imaging device to capture the image of the photographing object comprises:
  controlling an image composition of the imaging device such that imaging of the photographing object in an image to be captured satisfies a predetermined image composition rule; and
  capturing the image of the photographing object when the imaging of the photographing object in an image to be captured satisfies a predetermined image composition rule.

6. The method of claim 3, further comprising:
  determining a flight path of the aircraft when the imaging device captures the image of the photographing object,
  wherein controlling the imaging device carried by the aircraft to capture the image of the photographing object comprises controlling the imaging device to capture the image of the photographing object when the aircraft flies along the flight path.

7. The method of claim 1, wherein determining the flight path of the aircraft when the imaging device captures the image of the photographing object comprises determining the flight path of the aircraft based an input received from an external device.

8. The method of claim 7, wherein determining the flight path of the aircraft when the imaging device captures the image of the photographing object comprises:
  detecting a motion of the aircraft through a motion sensor of the aircraft;
  obtaining first motion data output from the motion sensor; and
  determining the flight path based on the first motion data.

9. The method of claim 1, wherein when the photographing object includes multiple main bodies, controlling the aircraft to fly to the photographing location based on the photographing information comprises determining the photographing location of the aircraft based on a number of the main bodies and the photographing information.

10. A device, comprising:
  a memory configured to store instructions; and
  a processor configured to execute the instructions to:
    determine photographing information related to a photographing object, the photographing information indicating an occupying scope of the photographing object in an image to be captured; and
    control an aircraft to fly to a photographing location based on the photographing information, including:
      search for and identify the photographing object through the imaging device of the aircraft;
      in response to searching for and identifying the photographing object, detect whether an occupying scope of the photographing object in an image to be captured is consistent with the occupying scope indicated by the photographing information; and
      determine the photographing location to be a current location of the aircraft when the occupying scope of the photographing object in the image to be captured is consistent with the occupying scope indicated by the photographing information.

11. The device of claim 10, wherein the processor is also configured to:
  obtain an image of the photographing object; and
  determine the photographing object based on the image.

12. The device of claim 11, wherein to obtain the image of the photographing object, the processor is also configured to:
  control an imaging device to capture the image of the photographing object prior to takeoff of the aircraft;
  control the imaging device to capture the image of the photographing object after the aircraft takes off; or
  receive the image of the photographing object from an external device.

13. The device of claim 12, wherein the processor is also configured to:
  control the imaging device carried by the aircraft to capture the image of the photographing object after the aircraft flies to the photographing location.

14. The device of claim 13, wherein to control the imaging device to capture the image of the photographing object, the processor is also configured to:
  control an image composition of the imaging device such that imaging of the photographing object in an image to be captured satisfies a predetermined image composition rule; and
  capture the image of the photographing object when the imaging of the photographing object in an image to be captured satisfies a predetermined image composition rule.

15. The device of claim 12,
  wherein the processor is also configured to determine a flight path of the aircraft when the imaging device captures the image of the photographing object, and
  wherein to control the imaging device carried by the aircraft to capture the image of the photographing object, the processor is also configured to control the imaging device to capture the image of the photographing object when the aircraft flies along the flight path.

16. The device of claim 10, wherein to determine the flight path of the aircraft when the imaging device captures the image of the photographing object, the processor is also configured to determine the flight path of the aircraft based an input received from an external device.

17. The device of claim 16, wherein to determine the flight path of the aircraft when the imaging device captures the image of the photographing object, the processor is also configured to:
   detect a motion of the aircraft through a motion sensor of the aircraft;
   obtain first motion data output from the motion sensor; and
   determine the flight path based on the first motion data.

18. The device of claim 10, wherein when the photographing object includes multiple main bodies, to control the aircraft to fly to the photographing location based on the photographing information, the processor is also configured to determine the photographing location of the aircraft based on a number of the main bodies and the photographing information.

* * * * *